(12) United States Patent
Pfeffer et al.

(10) Patent No.: US 8,877,149 B2
(45) Date of Patent: Nov. 4, 2014

(54) COMBUSTION FLUE GAS $NO_x$ TREATMENT

(75) Inventors: Henry A. Pfeffer, Mercerville, NJ (US); David E. Smith, Plainsboro, NJ (US)

(73) Assignee: Peroxychem LLC, Philadelphia, PA (US)

( * ) Notice: Subject to any disclaimer, the term of this patent is extended or adjusted under 35 U.S.C. 154(b) by 151 days.

(21) Appl. No.: 13/369,881

(22) Filed: Feb. 9, 2012

(65) Prior Publication Data

US 2012/0141346 A1 Jun. 7, 2012

Related U.S. Application Data

(63) Continuation of application No. 12/778,675, filed on May 12, 2010, now Pat. No. 8,147,785.

(60) Provisional application No. 61/178,689, filed on May 15, 2009.

(51) Int. Cl.
*B01D 47/00* (2006.01)
*B01D 53/56* (2006.01)
*B01D 53/34* (2006.01)
*C01D 15/00* (2006.01)
*B01D 53/86* (2006.01)
*B01D 53/75* (2006.01)
*B01D 53/60* (2006.01)
*B01D 53/58* (2006.01)

(52) U.S. Cl.
CPC .......... *B01D 53/60* (2013.01); *B01D 2251/106* (2013.01); *B01D 2251/2062* (2013.01); *B01D 53/869* (2013.01); *B01D 53/58* (2013.01); *B01D 2251/404* (2013.01); *B01D 53/56* (2013.01); *B01D 53/75* (2013.01); *B01D 2251/206* (2013.01); *B01D 2251/606* (2013.01); *B01D 2251/2067* (2013.01); *B01D 2251/304* (2013.01); *Y02C 20/10* (2013.01); *B01D 53/8625* (2013.01)
USPC ............ 423/210; 423/235; 423/237; 423/582

(58) Field of Classification Search
None
See application file for complete search history.

(56) References Cited

U.S. PATENT DOCUMENTS

| 4,213,944 | A | * | 7/1980 | Azuhata et al. ................ 423/235 |
| 5,240,689 | A | | 8/1993 | Jones |
| 2007/0154374 | A1 | | 7/2007 | Johnson |

FOREIGN PATENT DOCUMENTS

JP 54 056976 A2 5/1979

* cited by examiner

*Primary Examiner* — Melvin C Mayes
*Assistant Examiner* — Sheng H Davis
(74) *Attorney, Agent, or Firm* — Duane Morris LLP

(57) ABSTRACT

Combustion flue gas containing $NO_X$ and $SO_X$ is treated to remove $NO_X$ in a multistep system in which $NO_X$ is reduced in the flue gas stream via selective catalytic reduction or selective non-catalytic reduction with ammonia or an ammonia-forming compound, followed treatment with hydrogen peroxide to remove residual ammonia and, optionally, treatment with an alkali reagent to reduce residual $NO_X$ in the flue gas stream. The $NO_X$-depleted flue gas stream may also be subjected to a desulfurization treatment for removal of $SO_X$.

5 Claims, 1 Drawing Sheet

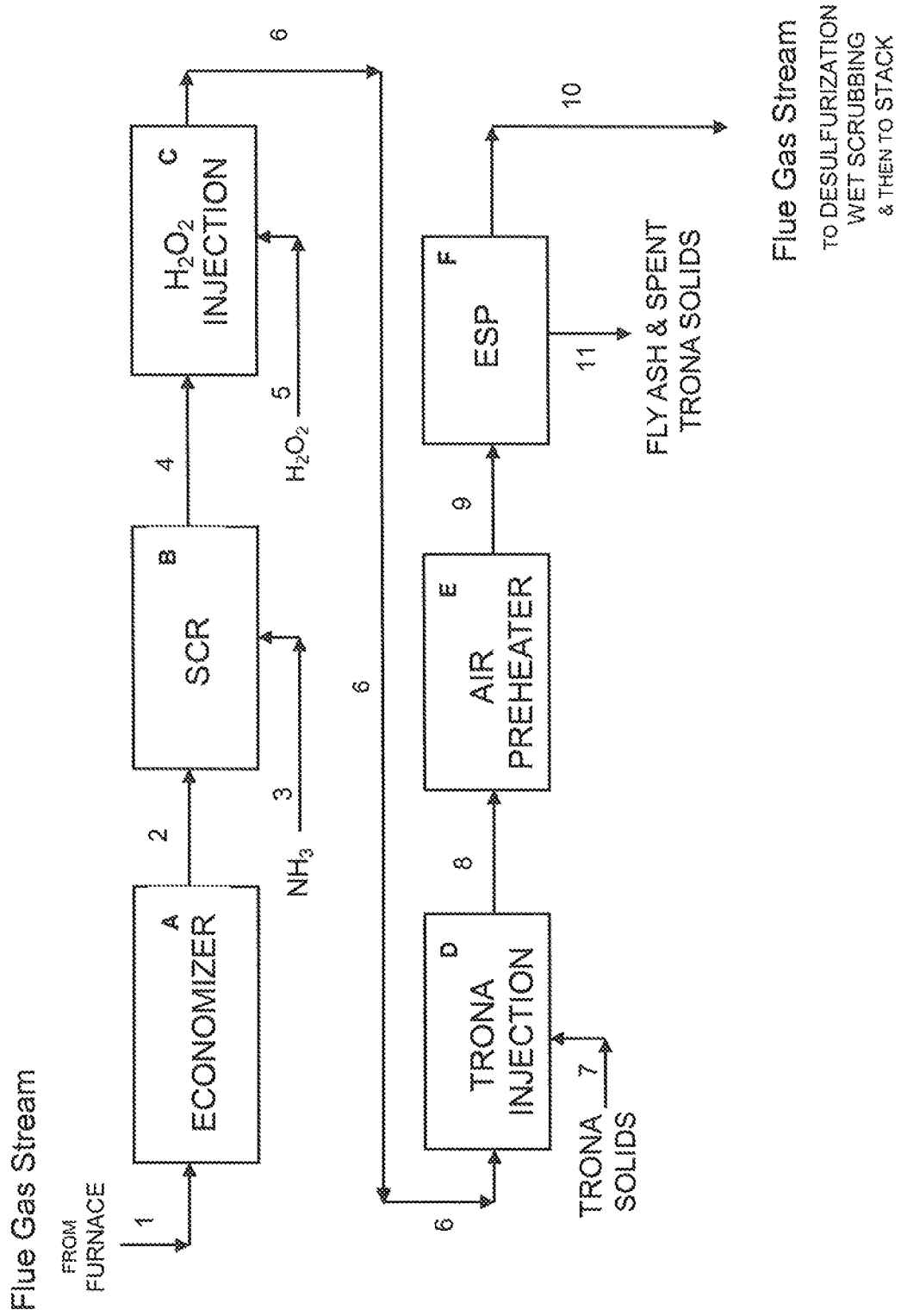

COMBUSTION FLUE GAS NO$_x$ TREATMENT

This application claims priority to U.S. patent application Ser. No. 12/778,675, now allowed as U.S. Pat. No. 8,147,785.

FIELD OF THE INVENTION

The present invention relates to air pollution control and more particularly to the treatment of a combustion flue gas stream from a stationary source to remove its NO$_x$ contaminants before the gas stream is released into the atmosphere.

BACKGROUND OF THE INVENTION

Combustion of fuels such as coal, coke, natural gas or oil typically results in the presence of pollutants in the combustion flue gas stream resulting from the combustion process or derived from impurities present in the fuel source. Electric utility power plants that burn coal are a significant source of such combustion process air pollutants, but other stationary fuel-burning facilities such as industrial boilers, waste incinerators, and manufacturing plants are also pollution sources.

The primary air pollutants formed by these stationary high temperature combustion sources are sulfur oxides (e.g., SO$_2$ and SO$_3$), also called SO$_x$ gases, and nitrogen oxides, also called NO$_x$ gases, both of which are acid gases. Other combustion pollutants of concern in these combustion flue gases include other acid gases such as HCl and HF, Hg (mercury), CO$_2$ and particulates. These individual pollutant components from stationary combustion sources have been subject to increasingly more stringent regulatory requirements over the past three decades, and emission standards are likely to be tightened in the future.

The removal or significant reduction of SO$_x$ and NO$_x$ contaminants, as well as other acid gases and elemental mercury, requires an integrated air pollution control system. Such integrated air pollution control systems represent a particular challenge in situations requiring retrofitting of first-time or additional or enhanced pollution control measures, e.g., older coal-fired electric power plants without any desulfurization measures or power plants with SO$_x$ controls requiring modifications for control of NO$_x$ gas emissions.

Nitrogen oxide or nitric oxide (NO) and smaller amounts of nitrogen dioxide (NO$_2$) are the normal constituents of NO$_x$ contaminants formed in the combustion of fossil fuels like coal, coke and oil. The presence of NO$_x$ in a flue gas stream discharged to the atmosphere can result in a "brown plume" and is a contributor to ground-level ozone pollution ("smog") and to acidifying nitrate deposition.

The wet scrubbing desulfurization techniques utilized for SO$_x$ removal from combustion flue gas are largely unsuccessful for removal of NO that is also present since the latter has low water solubility and is not amenable to aqueous alkali desulfurization scrubbing techniques. Although NO$_x$ formation can be controlled to some extent by modifying combustion conditions, current techniques for NO$_x$ removal from combustion flue gas normally utilize post-combustion treatment of the hot flue gas by Selective Catalytic Reduction (SCR) or Selective Non-Catalytic Reduction (SNCR).

The Selective Catalytic Reduction procedure utilizes a catalytic bed or system to treat a flue gas stream for the selective conversion (reduction) of NO$_x$ to N$_2$. The SCR procedure normally utilizes ammonia or urea as a reactant that is injected into the flue gas stream upstream, prior to their being contacted with the catalyst. SCR systems in commercial use typically achieve NO$_x$ removal rates of 80-90%, but improved catalyst systems reportedly provide over 90% removal rates.

The Selective Non-catalytic Reduction procedure is analogous to SCR except that no catalyst is employed in the treatment of a flue gas stream with ammonia or urea for the selective reduction of NO$_x$ to N$_2$. High treatment temperatures are required for the reduction reaction in SNCR. SNCR systems are favored for retrofit of smaller electric power utility plants because of their simplified installation and modest equipment requirements. A drawback to commercial SNCR systems is their NO$_x$ removal rates of only 30-70%.

Many individual approaches are described in the prior art for the removal of specific SO$_x$ and NO$_x$ components. In actual commercial practice, the engineering challenge is the design of an integrated air pollution control system that can be retrofitted to existing fossil-fuel fired electric utility plants that are in need of updated or upgraded pollution controls for one or more of SO$_2$, SO$_3$, NO, NO$_2$, Hg, HCl, HF, CO$_2$ and particulates. Since individual electric utility plants are rarely alike, retrofit systems need to be adaptable to the specific requirements and needs of the electric utility plant being modified.

The present invention provides an air pollution retrofit system for the effective control of residual ammonia and NO$_x$ in SCR-treated or SNCR-treated combustion flue gas streams, utilizing hydrogen peroxide and an alkali sorbent as reactants. The novel NO$_x$ abatement retrofit system of this invention is not disclosed or suggested in prior art treatments for abating SO$_x$ and NO$_x$ contaminants in combustion flue gas streams.

U.S. Pat. No. 4,213,944 of Azuhata et al. (Hitachi) discloses a process for removing nitrogen oxides from a hot gas stream containing the same by adding a reducing agent, preferably ammonia, and hydrogen peroxide into hot gas stream at a temperature of 400-1200° C. to decompose the nitrogen oxides to nitrogen gas and water. The hydrogen peroxide is added concurrently with the ammonia and is said to increase the activity of the ammonia, particularly at gas temperatures of 400-800° C., by decomposing the ammonia to make it reactive with the NO$_x$. Sufficient hydrogen peroxide is added with the ammonia so that excess unreacted ammonia is also decomposed. U.S. Pat. No. 4,213,944 of Azuhata et al. is hereby incorporated by reference for its disclosures about the reaction of H$_2$O$_2$ and NH$_3$ and related reactions.

U.S. Pat. Nos. 5,120,508 and 4,783,325 of Jones (Noell) disclose methods of converting NO to NO$_2$ in a flue gas stream by injecting a gas containing a peroxyl initiator and oxygen into the NO-containing gas stream. The peroxyl initiator is preferably propane but may also be other hydrocarbons or hydrogen peroxide or hydrogen. The resultant NO$_2$-containing gas stream is then treated in an absorption section to remove NO$_x$ and SO$_x$ with a dry sorbent such as nahcolite or trona, the dry sorbent being captured in a baghouse before the treated gas stream is discharged to the atmosphere.

U.S. Pat. No. 5,670,122 of Zamansky et al. (Energy & Environmental Research) discloses a method for removing NO, SO$_3$, CO, light hydrocarbons and mercury vapor (Hg) from combustion flue gas by injecting into the gas stream atomized droplets of either hydrogen peroxide or a mixture of hydrogen peroxide and methanol, to convert the respective gas contaminants to NO$_2$, SO$_2$, CO$_2$ (for the CO and light hydrocarbons) and HgO. The treatment is carried out at a gas temperature of about 377° C. to about 827° C., and the reaction products are subsequently removed in a downstream scrubbing operation. The treatment also may be carried out in combination with SNCR NO$_x$ reduction technology, with the SNCR-treated combustion gas stream being treated downstream with the $H_2O_2$ or $H_2O_2/CH_3OH$ injection treatment.

U.S. Pat. No. 6,676,912 of Cooper et al. (NASA) discloses a method of removing NO from stationary combustion gas streams by injection of $H_2O_2$ into the gas stream to oxidize NO to $NO_2$ and $HNO_3$ and $HNO_2$, which species are more readily recovered via aqueous wet scrubbing. The nitrogen acids and residual $NO_2$ are then removed via wet scrubbing with water or an aqueous alkaline medium or via passage of the flue gas stream through a particulate alkaline sorbent in a baghouse. The method may optionally include a preliminary flue gas desulfurization scrubbing step to remove $SO_2$, prior to the $H_2O_2$ injection. U.S. Pat. No. 6,676,912 of Cooper et al. is hereby incorporated by reference for its disclosures about the reaction of $H_2O_2$ and $NO_X$ and related reactions.

The present invention provides an air pollution retrofit system for the effective downstream removal of residual ammonia in SCR-treated or SNCR-treated flue gas streams and, optionally, the further removal of $NO_X$ in the SCR-treated or SNCR-treated flue gas streams.

SUMMARY OF THE INVENTION

In accordance with the present invention, $NO_X$ is removed from a flue gas stream in a method comprising subjecting a combustion flue gas stream containing $NO_X$ to a selective catalytic reduction operation or selective non-catalytic reduction operation by injecting ammonia or an ammonia-forming compound into the flue gas stream as an agent for reducing the $NO_X$, wherein an excess of ammonia is introduced to yield a flue gas stream containing unreacted residual ammonia and a reduced concentration of $NO_X$; and thereafter injecting hydrogen peroxide into the flue gas stream containing unreacted residual ammonia, in an amount sufficient to react with the residual ammonia present in the flue gas stream, to yield a flue gas stream having a reduced concentration of residual ammonia.

Another embodiment of the present invention is a method for removing $NO_X$ from a flue gas stream comprising injecting ammonia or an ammonia-forming compound into a combustion flue gas stream containing $NO_X$, wherein an excess of ammonia is introduced into the flue gas stream as an agent for reducing the $NO_X$, to yield a flue gas stream containing unreacted residual ammonia and a reduced concentration of $NO_X$; thereafter injecting hydrogen peroxide into the flue gas stream containing unreacted residual ammonia, in an amount sufficient to react with residual ammonia present in the flue gas stream, to yield a flue gas stream having a reduced concentration of residual ammonia; and contacting the ammonia-depleted flue gas stream with an alkali reagent in an amount sufficient to remove $NO_X$ present in the gas stream, yielding a flue gas stream with reduced concentrations of ammonia and $NO_X$.

Still another embodiment of the present invention is a system for removing $NO_X$ from a flue gas stream containing $NO_X$ and $SO_X$ comprising a selective catalytic reduction unit or selective non-catalytic reduction unit for reducing the $NO_X$ content of a combustion flue gas, in which ammonia or an ammonia-forming compound is injected into a combustion flue gas stream containing $NO_X$ and $SO_X$ as an agent for reducing the $NO_X$; a hydrogen peroxide injection operation, located downstream of the $NO_X$ reduction unit, in which hydrogen peroxide is injected into the ammonia-containing flue gas stream for reaction with residual ammonia present in the flue gas stream; and an alkali reagent treatment operation, located downstream of the hydrogen peroxide injection operation, in which alkali reagent is contacted with the ammonia-depleted flue gas stream to react with $NO_X$ present in the gas stream.

BRIEF SUMMARY OF THE DRAWING

The FIGURE is a schematic flow diagram illustrating a preferred embodiment of the combustion flue gas $NO_X$ treatment process of this invention that is described in the Example.

DETAILED DESCRIPTION OF THE INVENTION

The present invention is directed to improved $NO_X$ treatment processes that utilize ammonia or an ammonia-forming compound to reduce $NO_X$ in combustion flue gas streams from stationary sources, such as coal-fired electric utility power plants. The present invention encompasses both methods of treating flue gas streams as well as systems intended for implementing the inventive method.

Combustion flue gas streams treated with $NH_3$ or its equivalent in either selective catalytic reduction (SCR) procedures or selective non-catalytic reduction (SNCR) procedures normally contain residual, unreacted $NH_3$ as well as unreacted or partially-reacted $NO_X$ in the SCR- or SNCR-treated flue gas stream.

The present invention provides for the removal of the residual unreacted $NH_3$ from the $NH_3$-containing flue gas stream and, further, for the further reaction of unreacted $NO_X$ (e.g., NO) or partially-reacted $NO_X$ (e.g., $NO_2$) in the SCR- or SNCR-treated flue gas stream. The invention is particularly useful in the treatment of $NH_3$-containing SNCR-treated flue gas streams, which typically contain unreacted ammonia and substantial concentrations of unreacted or partially reacted $NO_X$, as explained in more detail below.

In the present invention, residual unreacted $NH_3$ in an $NH_3$-containing flue gas stream is removed using hydrogen peroxide. The unreacted or partially reacted $NO_X$ (e.g., NO and $NO_2$) in a SCR- or SNCR-treated flue gas stream may then, optionally but preferably, be reacted further with an alkali reagent, to provide an $NH_3$-free and $NO_X$-depleted flue gas stream. The $SO_X$ in the combustion flue gas stream may also be removed in desulfurization operations, in conjunction with the treatment procedures of the present invention.

Combustion Flue Gas Stream

The combustion flue gas stream exiting the combustion zone of a stationary source contains a variety of components that are desirably reduced or removed from the flue gas prior to its being discharged to the atmosphere, among which are the $NO_X$ components treated according to the present invention. The precise composition of the combustion flue gas depends primarily on the nature of the fuel and on the furnace design and operating parameters. For example, the fuel may be, e.g., coal, oil, coke or natural gas, etc., and in the case of coal, coal may be high sulfur or low sulfur, bituminous or anthracite, etc.

A representative flue gas stream obtained from combustion of high sulfur coal containing 2.5 wt % sulfur, burned using 10% excess air, has the composition shown in Table 1.

TABLE 1

| Flue Gas Composition | |
|---|---|
| Component | Concentration: volume basis |
| NO | 350-400 parts per million (ppm) |
| $NO_2$ | 10-20 ppm |
| $SO_2$ | 0.22% |
| $SO_3$ | 20 ppm |
| $H_2O$ | 9% |
| $CO_2$ | 15% |
| Hg | 1 part per billion (ppb) |
| Other Gases | 76% |

The NO concentration in the flue gas stream is typical of that expected from the burning of high sulfur coal in a furnace that is not equipped with low $NO_X$ burners. The $NO_2$ concentration typically represents about 5% of the total $NO_X$. The $SO_2$ concentration in the flue gas stream is relatively high, as would be expected from the burning of high sulfur coal. The $SO_3$ concentration is typically only about 1% of the $SO_2$ concentration.

The foregoing flue gas composition is simply meant to be illustrative of a typical combustion flue gas stream. The present invention is adapted to be used with a wide range of different flue gas compositions and air pollution control systems, within the parameters described in more detail below.

The present invention is intended for use with combustion flue gas air pollution control systems that utilize an $NO_X$ treatment based on selective catalytic reduction of $NO_X$ or selective non-catalytic reduction of $NO_X$ using ammonia or an ammonia-forming reducing agent, resulting in flue gas streams that contain residual ammonia and also contain some unreacted or partially reacted $NO_X$.

Ammonia Injection—SCR-SNCR

The $NO_X$ treatment method of the present invention involves an initial $NO_X$ treatment of a $NO_X$-containing combustion flue gas stream in a treatment step, i.e., unit operation, which is a selective catalytic reduction (SCR) reaction or a selective non-catalytic reduction (SNCR) reaction, using ammonia or an ammonia-forming compound as the reducing agent.

The preferred reducing agent for the SCR or SNCR treatment of this invention is ammonia. Ammonia is a well known and widely-available chemical that is normally a gas at room temperature and pressure. The ammonia may be injected or otherwise introduced into the combustion flue gas stream either in anhydrous form or aqueous form, e.g., an aqueous ammonia solution.

The reducing agent may also be urea ($NH_2CONH_2$), also called carbamide, which is a stable solid at room temperature. Urea is water soluble and, in the presence of water, will gradually hydrolyze to form ammonium carbamate ($H_2N$—$COONH_4$), which itself slowly decomposes into ammonia and carbon dioxide. Urea is preferably injected into the combustion flue gas stream in the form of an aqueous solution or slurry.

The reducing agent used in the present invention may also be other $NH_3$-forming or $NH_3$-like compounds, such as cyanuric acid (($CNOH)_3$) also known as 1,3,5-triazine-2,4,6-triol, ammonium sulfate (($NH_4)_2SO_4$), and hydrazine ($N_2H_4$).

The selective catalytic reduction (SCR) of $NO_X$ in the present invention is carried out in a conventional manner, using SCR equipment and procedures well known to those skilled in the art. The SCR reactor is equipped with a catalyst bed, which is preferably in modular form (e.g., extruded ceramic honeycomb or plates) but which can also be in the form of pellets or the like. In addition to the catalytic reactor, the other components of the SCR system include a reagent storage and injection system, e.g., tanks, vaporizers, preheaters, pumps, mixers, injectors, associated controls, and $NO_X$ continuous emissions monitors.

The ammonia (or urea or other $NH_3$-forming compound) is injected or otherwise introduced into the $NO_X$-containing combustion flue gas stream upstream of the catalyst in the SCR reactor. The injection may be carried out with conventional gas (e.g., for anhydrous ammonia) or liquid injection (e.g., for aqueous ammonia) equipment.

The selective reduction reaction involves the catalyzed reduction reaction of $NO_X$ with $NH_3$ (the reducing agent) to form $N_2$, and normally some $NO_2$ intermediate, and $H_2O$. The selective in SCR refers to the preference of the ammonia to react with NO and not other pollutant species in the flue gas stream. In actual practice, SCR treatment of $SO_X$- and $NO_X$-containing flue gas streams typically results in the catalyzed formation of some by-product $SO_3$ from $SO_2$. Efficient catalyst performance in the SCR reaction requires the presence of oxygen, with at least 2-3 vol % $O_2$ preferably being present.

The reactions in selective catalytic reduction, as well as in selective non-catalytic reduction, of a $NO_X$- and $SO_X$-containing combustion flue gas using ammonia as the reducing agent are believed to include the following stoichiometric reactions:

Primary Reactions:

$$4NO + 4NH_3 + O_2 \rightarrow 4N_2 + 6H_2O \quad (1)$$

$$2NO_2 + 4NH_3 + O_2 \rightarrow 3N_2 + 6H_2O \quad (2)$$

$$NO + NO_2 + 2NH_3 \rightarrow 2N_2 + 3H_2O \quad (3)$$

Secondary Reactions:

$$2SO_2 + O_2 \rightarrow 2SO_3 \quad (4)$$

$$2NH_3 + SO_3 + H_2O \rightarrow (NH_4)_2SO_4 \quad (5)$$

$$NH_3 + SO_3 + H_2O \rightarrow NH_4HSO_4 \quad (6)$$

Primary Reaction for Use of Urea in Lieu of Ammonia:

$$4NO + 2(NH_2)_2CO + O_2 \rightarrow 4N_2 + 4H_2O + 2CO_2 \quad (7)$$

The term normalized stoichiometric ratio (NSR) describes the N/NO molar ratio of injected reagent (e.g., $NH_3$) to $NO_X$ concentration, particularly NO which is the primary $NO_X$ constituent, in the flue gas stream. The NSR is a measure of the amount of reagent added relative to the amount theoretically required to react with the $NO_X$ present. It should be evident from reactions (1) and (7) that use of ammonia as a reactant theoretically requires 1 mole of $NH_3$ (NSR=1), but use of urea in lieu of ammonia would theoretically requires only ½ mole of urea.

In the actual operation of a SCR or SNCR operation, the ammonia or other ammonia-generating compound will typically not be completely reacted with the $NO_X$ species in the flue gas stream being treated, even at NSR=1. For example, a SNCR operation employing stoichiometric amounts of ammonia with about 10% excess air may result in about 10 ppm (by volume), or more or less, unreacted ammonia (also called ammonia slip) in the effluent gas stream. A SCR operation employing stoichiometric amounts of ammonia with about 10% excess air may result in about 5 ppm (by volume), or more or less, unreacted ammonia in the effluent gas stream.

For both SCR and SNCR operations, increasing the amount of reagent used beyond the stoichiometric amount required will generally provide a desirable increase in the amount of $NO_X$ reduction. However, such increased $NO_X$ reductions will also result in increased concentrations of unreacted reagent (i.e., ammonia or urea) remaining in the treated flue gas stream, normally an undesirable consequence.

The present invention, however, provides an efficient means for removing any unreacted ammonia that passes through the SCR operation or NSCR operation and is contained in the downstream flue gas stream. Consequently, the preferred operation of SCR and SNCR procedures in the present invention calls for use of a stoichiometric excess of ammonia (or ammonia-forming compound), based on the amount of $NO_X$ in the flue gas stream entering the SCR or SNCR operation. The ammonia is preferably introduced into flue gas stream in an amount sufficient to provide a stoichiometric molar excess, with an NSR greater than 1, based on the amount of $NO_X$ present in the flue gas stream, and more preferably is introduced in a stoichiometric excess such that the NSR is at least about 1.2 up to about 5, and most preferably is introduced in a stoichiometric excess such that the NSR is at least about 1.5 (50% excess). A maximum NSR of about 3 is most preferred.

In the present invention, a wide variety of conventional catalyst compositions may be utilized in the SCR reactor, and such catalyst compositions are well known to those skilled in the art. The catalyst (the catalytically-active metal) selection will typically depend on the combustion flue gas stream treatment temperature. The catalyst substrate will normally be selected based on the type of reactor or reactor configuration used.

The primary factor that affects SCR operational efficiency is the choice of catalyst and reactor bed catalyst design; other factors include temperature, catalyst bed residence time (a fraction of a second up to about a second), reagent injection rate, reagent-flue gas mixing, and flue gas $NO_X$ concentration. Treatment temperatures for SCR can vary widely, e.g., about 350° F. to about 1100° F., and depend on the choice of catalyst and the upstream/downstream location of the SCR reactor within flue gas air pollution control system in use at the facility in question. Typical SCR $NO_X$ removal efficiencies range from about 80% to at least about 90% $NO_X$ reduction.

At SCR operating/treatment temperatures of about 450° F. to about 800° F., the SCR catalyst is preferably selected from base metal catalysts, e.g., typically titanium and vanadium oxides, which also may contain molybdenum, tungsten, and other elements.

A preferred treatment temperature range for SCR operation is about 600° F. to about 675° F. In many electric utility power plants, the preferred SCR operating temperature range of about 600° F. to about 675° F. is readily obtained by locating the SCR reactor so as to treat the flue gas stream downstream of the economizer and upstream of the air pre-heater. This preferred temperature range typically provides for maximized conversion of $NO_X$ with a catalyst choice optimized for this temperature range, e.g., reaction efficiencies of at least about 90% $NO_X$ conversion or higher are possible.

A SCR reactor can also be operated at lower or higher temperatures than the preferred ranges noted above, with a suitable catalyst selection. At low SCR treatment temperatures, e.g., about 350° F. to about 550° F., precious metal catalysts are preferred, e.g., platinum and palladium. At very high SCR treatment temperatures, e.g., about 675° F. to about 1100° F., zeolite catalysts are preferred.

In the present invention, selective non-catalytic reduction (SNCR) of $NO_X$ may also be employed in an initial $NO_X$ treatment operation. The selective non-catalytic reduction of $NO_X$ is operated without the benefit of a catalyst that facilitates the reduction reaction in SCR. Consequently, the temperature of the flue gas stream at which the SNCR procedure is carried out must be relatively high, about 1500° F. to about 2100° F. The SNCR reactor is typically located just downstream of the combustion unit, so as to utilize the very hot flue gas exiting the combustion unit, and upstream of the economizer. It is possible to expand the lower end of this temperature treatment range by the addition of suitable chemical additives, as well as providing long residence times.

Like the SCR procedure, a selective non-catalytic reduction reaction is carried out in a conventional manner, using SNCR equipment and procedures well known to those skilled in the art. The principal components of the SNCR system are a reagent storage and injection system, e.g., tanks, vaporizers, pre-heaters, pumps, mixers, injectors, associated controls, and $NO_X$ continuous emissions monitors. The injection may be carried out with conventional gas (e.g., for anhydrous ammonia) or liquid or gas/liquid injection (e.g., for aqueous ammonia) equipment.

Factors that affect the SNCR operational efficiency include temperature, residence time, reagent injection rate and amount, reagent-flue gas mixing, and flue gas $NO_X$ concentration. Generally, if the reagent is adequately mixed with the $NO_X$-containing flue gas at the proper temperature and is given an adequate residence time (a fraction of a second to a few seconds), then satisfactory SNCR efficiencies will be achieved. Typical SNCR $NO_X$ removal efficiencies range from about 30% to about 70% $NO_X$ reduction.

The present invention is particularly suited for use with SNCR $NO_X$ abatement procedures. Reaction efficiencies for SNCR $NO_X$ treatment can be improved by use of increased or larger amounts of ammonia in the SNCR operation, yet this invention provides means for removing unreacted ammonia (ammonia slip) downstream of the SNCR operation, as well as residual $NO_X$, as described below.

Hydrogen Peroxide Treatment

The flue gas stream, after being treated with ammonia or ammonia-forming reagent via the SCR or SNCR procedure, is next subjected to treatment with aqueous hydrogen peroxide in the method of this invention, to reduce the concentration of residual (unreacted or otherwise unused) ammonia in the SCR- or SNCR-treated flue gas stream.

The aqueous hydrogen peroxide is injected into the SCR- or SNCR-treated flue gas stream, in an amount sufficient to react with at least a portion of the residual ammonia present in the $NH_3$-containing flue gas stream. The amount of hydrogen peroxide used with respect to the ammonia present in the flue gas stream is preferably in the range of from about ¼ mole $H_2O_2$ per mole $NH_3$ up to about 15 moles of $H_2O_2$ per mole $NH_3$.

More preferably, the molar ratio of hydrogen peroxide to the ammonia present in the flue gas stream is in the range of from about ½ mole $H_2O_2$ per mole $NH_3$ up to about 10 moles of $H_2O_2$ per mole $NH_3$. Most preferably, the hydrogen peroxide is used in an amount that provides a molar excess with respect to the molar amount of ammonia present in the flue gas stream. The hydrogen peroxide is also most preferably used in an amount that provides up to about 5 moles of $H_2O_2$ per mole $NH_3$ present in the flue gas stream.

Since the hydrogen peroxide in this invention is targeted for removal of residual ammonia (and not added upstream during the SCR or SNCR procedure where ammonia is introduced), the amount of hydrogen peroxide required is minimized, as contrasted with its prior art use to catalyze the reduction reaction of $NO_X$ with ammonia upstream, as in Azuhata et al., U.S. Pat. No. 4,213,944.

The amount of hydrogen peroxide contacted with the $NH_3$-containing flue gas stream is desirably sufficient to reduce the ammonia concentration in the $H_2O_2$-treated flue gas stream to less than about 10 ppm (by volume) $NH_3$. In the preferred excess amounts, the hydrogen peroxide contacted with the $NH_3$-containing flue gas stream can reduce the ammonia concentration in the $H_2O_2$-treated flue gas stream to less than about 5 ppm $NH_3$ and, within the preferred temperature ranges, to less than about 3 ppm $NH_3$.

The aqueous hydrogen peroxide may be injected into the $NH_3$-containing flue gas stream using conventional gas-liquid or liquid injection equipment. The aqueous hydrogen peroxide is preferably injected, i.e., introduced, into the flue gas stream as an atomized fine spray through one or more nozzles. The nozzles should be designed to provide uniform dispersal and good mixing of the hydrogen peroxide into the $NH_3$-containing flue gas stream. In the case of extremely hot flue gas streams, the injection system design should include provisions for ensuring that the aqueous hydrogen peroxide does not become overheated (and vulnerable to decomposition) prior to its introduction into the hot flue gas stream.

The aqueous hydrogen peroxide used in the present invention may have a wide range of aqueous solution concentrations, with aqueous solutions containing about 10 wt % to about 50 wt % $H_2O_2$ being preferred and those containing about 20 wt % to about 40 wt % $H_2O_2$ being more preferred. Aqueous hydrogen peroxide solutions within these concentration ranges are readily available from commercial suppliers, as stabilized $H_2O_2$ solutions.

Concentrations of aqueous $H_2O_2$ above 50 wt % $H_2O_2$ are feasible but require stringent handling and safety measures and are best avoided for that reason. Concentrations of aqueous $H_2O_2$ below 10 wt % $H_2O_2$ are likewise feasible but are relatively dilute, requiring relatively larger volumes to provide the same amount of $H_2O_2$ as provided in much smaller volumes of more concentrated aqueous solutions.

The activity of the hydrogen peroxide in its reaction with residual ammonia may optionally be enhanced or increased, in the present invention, by the use of one or more activators in conjunction with the aqueous hydrogen peroxide. The activator may be introduced into the aqueous hydrogen peroxide solution shortly before the latter is injected into the $NH_3$-containing flue gas stream or may be introduced concurrently with the aqueous hydrogen peroxide solution during the injection procedure, provided that there is good mixing between the two.

Activators for hydrogen peroxide include metal ions (e.g., iron, copper, manganese, chromium, nickel), metals (e.g., platinum, silver) and metal compounds (e.g., oxides, hydroxides or sulfides, e.g., of manganese, iron, copper, palladium). A preferred activator is iron and, as is evident for the exemplified metals, transition metals, including the heavy metals, are also preferred. Combinations of metal activators may be used, with iron and copper being a preferred synergistic combination.

Other materials that may be used as hydrogen peroxide activators in the present invention include oxidizing agents such as ozone, hypochlorite (e.g., sodium or calcium hypochlorite), chlorite (e.g., sodium chlorite), chlorate (e.g., sodium, potassium, or magnesium chlorate), and the like.

The hydrogen peroxide activator may be introduced into the aqueous hydrogen peroxide solution in dissolved form or in suspended form. Small amounts of activator, in the range of parts per million, are normally sufficient to enhance the hydrogen peroxide activity. The activator-enhanced activity of the hydrogen peroxide extends not only to the removal of residual ammonia but also to the reaction of hydrogen peroxide with other components in the flue gas, e.g., $NO_X$.

Residence time required for reaction of the hydrogen peroxide and residual ammonia is typically very short, from a fraction of a second, e.g., 0.01 second, to less than a few seconds, e.g., up to about 5 seconds. Preferred residence times are generally less than about 2 seconds. The optimum residence time will normally depend on the temperature of the flue gas stream, with higher gas temperatures providing more rapid reaction.

The temperature range for the hydrogen peroxide treatment in the flue gas stream normally depends on the point or location at which the hydrogen peroxide is injected into the residual $NH_3$-containing flue gas stream, downstream of the SCR or SNCR treatment. As was noted in the earlier discussion of the SCR and SNCR treatments, the flue gas temperature for these $NO_X$ treatment procedures can vary over wide ranges.

In general, special gas temperature adjustments (i.e., heating or cooling steps) are not required for the flue gas stream as a prerequisite of the hydrogen peroxide treatment step. The hydrogen peroxide injection, in the present invention, may be carried out with the flue gas stream temperature at whatever temperature the flue gas stream happens to be downstream of the SCR or SNCR treatment operation.

Consequently, the hydrogen peroxide treatment may be carried out with flue gas stream temperatures ranging from about 250° F. to about 1100° F. for SCR-treated flue gas streams. Flue gas temperatures of within the range of about 250° F. to about 800° F. are preferred for SCR-treated flue gas streams, for the hydrogen peroxide injection step.

In the case of SNCR-treated gas streams, which are typically subjected to SNCR treatment at high flue gas stream temperatures, the hydrogen peroxide injection step may be carried out with SNCR-treated flue gas stream temperatures ranging from about 250° F. to about 1500° F., with about 250° F. to about 1100° F. being preferred, and about 250° F. to about 800° F. being more preferred. The preferred lower temperatures are possible by locating the hydrogen peroxide injection point downstream of the economizer in the flue gas stream ducting from an electric utility power plant.

The hydrogen peroxide treatment is primarily directed to removal of residual $NH_3$ in the flue gas stream downstream of the SCR or SNCR procedure, and, as noted above, an excess of hydrogen peroxide (with respect to the $NH_3$ in the flue gas stream) may be employed to this end in the present invention. Any unreacted hydrogen peroxide excess that remains after its reaction with the residual ammonia is also available to react with other contaminants in the flue gas stream, converting them to less objectionable or more readily removed species.

Such other contaminants that are vulnerable to reaction with $H_2O_2$ include unreacted NO in the SCR-treated or SNCR-treated flue gas stream; mercury (Hg), typically present in small but significant amounts, about 2 ppb or less; CO, typically present at less than 500 ppm (by volume); and unreacted light hydrocarbons. The reaction of hydrogen peroxide with NO is believed to result in the formation of $NO_2$ and/or related species, which may be removed via the optional alkali reagent treatment described below. Consequently, any excess hydrogen peroxide remaining after reaction with the residual ammonia can serve to enhance the overall pollution reduction in the flue gas stream.

Alkali Reagent Treatment

In another embodiment of the present invention, the ammonia-depleted flue gas stream is also treated with an alkali reagent, to effect further removal of residual $NO_X$ present in the SCR- or SNCR-treated flue gas stream. The residual $NO_X$ species present in the $H_2O_2$-treated and $NH_3$-depleted flue gas stream are typically $NO_2$ and NO. The NO component of the residual $NO_R$ is typically present in low concentrations, since the excess ammonia in the SCR or SNCR operation of this invention facilitates conversion of NO to $N_2$ and, in addition, any excess hydrogen peroxide in the $NH_3$ removal step is believed to facilitate conversion of NO to $NO_2$. It should be noted that residual $NO_2$ and NO in the $H_2O_2$-treated and $NH_3$-depleted flue gas stream differ in their ease of removal; $NO_2$ is water soluble and therefore more readily reacted, whereas NO is relatively water-insoluble.

The alkali reagent is utilized in either a wet or a dry treatment of the $NH_3$-depleted flue gas stream containing residual $NO_X$. Several approaches may be used for contacting the alkali reagent with the $NH_3$-depleted $NO_X$-containing flue gas stream.

The alkali reagent may be contacted with the flue gas stream (i) as a dry sorbent, e.g., by injection of dry particulate sorbent into the flue gas stream; (ii) as a slurry of particulate sorbent in admixture with water, e.g., by injection of the aqueous slurry of particulate sorbent into the flue gas stream; (iii) as a solution of water-soluble or partially water-soluble reagent in an aqueous medium, e.g., by injection of the aqueous reagent solution into the flue gas stream via a spray drying technique; or (iv) as an aqueous solution or aqueous slurry of water-soluble or partially water-soluble reagent using a conventional wet scrubber or absorber with the reagent in an aqueous medium as the scrubber/absorber liquid medium.

The ammonia-depleted flue gas stream, typically still containing residual $NO_X$, is treated with the alkali reagent in the present invention, to effect additional removal of the $NO_X$ present in the flue gas stream. The alkali reagent treatment of the $NH_3$-depleted flue gas stream is normally carried out downstream of the hydrogen peroxide treatment step. The alkali reagent treatment may be carried out as a one step procedure or multistep (e.g., two steps or stages) procedure.

The alkali reagent material is selected on the basis of its ability, when introduced into, or injected into, or otherwise contacted with the $NO_X$-containing flue gas stream, to react or otherwise combine with $NO_X$ present in the flue gas stream to effect removal of the $NO_X$ components as flue gas stream contaminants.

The alkali reagent may be selected from any of several known alkali compounds but is preferably a soda-type reagent containing $NaHCO_3$ and/or $Na_2CO_3$. The alkali reagent may also be lime (CaO), slaked lime ($Ca(OH)_2$) or limestone ($CaCO_3$), optionally in combination with a soda-type reagent.

Preferred alkali reagents for use in the present invention are soda-type reagents, both those containing $NaHCO_3$ and those containing $Na_2CO_3$, as well as combinations of these. Such soda-type alkali reagents include $NaHCO_3$-containing materials such as trona (a natural mineral containing $Na_2CO_3 \cdot NaHCO_3 \cdot 2H_2O$), sodium sesquicarbonate (refined or re-crystallized trona, $Na_2CO_3 \cdot NaHCO_3 \cdot 2H_2O$), nahcolite (a natural mineral containing $NaHCO_3$), sodium bicarbonate ($NaHCO_3$), and wegscheiderite (a natural mineral containing $Na_2CO_3 \cdot 3NaHCO_3$). Soda ash ($Na_2CO_3$) is another suitable alkali reagent for use in the present invention. Mixtures of two or more these soda reagents may also be used as the alkali reagent. Trona and soda ash are preferred alkali reagents.

The interaction between the $NO_X$ in the flue gas stream and alkali reagent that is a $NaHCO_3$-containing soda reagent is believed to include reaction between $NO_2$ and $NaHCO_3$ yielding a nitrate salt with byproduct carbon dioxide and water. This reaction appears to be facilitated or otherwise catalyzed by the presence of moisture and/or $SO_2$ in the flue gas stream. In addition, it is believed that residual NO in the flue gas stream may also react with a $NaHCO_3$-containing soda reagent in an analogous reaction when the flue gas stream is contacted with a $NaHCO_3$-containing soda reagent.

The following additional reaction may occur, involving both the $NO_2$ and $SO_2$ present in the in the flue gas stream treated with an alkali reagent that is a $NaHCO_3$-containing soda reagent:

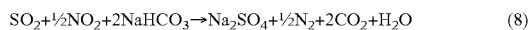

$$SO_2 + \tfrac{1}{2}NO_2 + 2NaHCO_3 \rightarrow Na_2SO_4 + \tfrac{1}{2}N_2 + 2CO_2 + H_2O \quad (8)$$

Reaction (10) is an overall reaction that appears to involve the following two reactions:

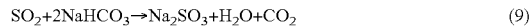

$$SO_2 + 2NaHCO_3 \rightarrow Na_2SO_3 + H_2O + CO_2 \quad (9)$$

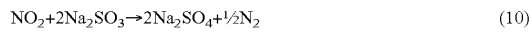

$$NO_2 + 2Na_2SO_3 \rightarrow 2Na_2SO_4 + \tfrac{1}{2}N_2 \quad (10)$$

The amount of alkali reagent introduced into contact with the $NO_X$-containing flue gas stream for residual $NO_X$ removal is normally relatively modest, since the upstream SCR or SNCR $NO_X$ reduction procedure typically effects a significant decrease in $NO_X$ concentration in the flue gas stream. It should be recognized that the concentration of $NO_X$ in the flue gas stream will vary, depending on whether the upstream $NO_X$ reduction procedure utilized SCR, typically resulting in 80-90% conversion of the $NO_X$ to $N_2$, or SNCR, typically resulting in only about 50% conversion of the $NO_X$ to $N_2$.

Sufficient alkali reagent is employed, either as dry sorbent or as reagent in an aqueous medium, to reduce the $NO_2$ concentration in the alkali reagent-treated flue gas stream to less than about 80% of its concentration in the SCR- or SNCR-treated and $NH_3$-depleted flue gas stream, prior to treatment with the alkali reagent. Preferably, the alkali reagent treatment is sufficient to reduce the $NO_2$ present in the treated flue gas stream to less than about 50%, and more preferably less than about 30%, of its concentration in the SCR- or SNCR-treated and $NH_3$-depleted flue gas stream.

The alkali reagent employed in the present invention is normally sufficient, when contacted with the $H_2O_2$-treated, ammonia-depleted flue gas stream, to reduce the residual $NO_2$ concentration to less than about 50 ppm (by volume) $NO_2$. The alkali reagent is preferably employed in amounts and under conditions sufficient to reduce the residual $NO_2$ concentration to less than about 30 ppm $NO_2$, and more preferably to less than 20 ppm $NO_2$ and most preferably to less than 10 ppm $NO_2$, in the treated flue gas stream discharged into the atmosphere.

The amount of alkali reagent introduced into and contacted with the flue gas stream should provide at least one mole of sodium (for $NaHCO_3$- or $Na_2CO_3$-containing reagents) or at least ½ mole of calcium (for CaO and other calcium-containing reagents), as the case may be, based on the amount of $NO_2$ present in the $H_2O_2$-treated and $NH_3$-depleted flue gas stream. Preferably, the amount of introduced alkali reagent provides at least two moles of sodium based on the amount of $NO_2$ present in the flue gas stream being treated with a soda-type alkali reagent.

If the alkali reagent is utilized in the form of a dry particulate sorbent, the sorbent is preferably introduced into the flue gas stream in admixture with water, e.g., as a slurry, or into a humidified flue gas stream that has had moisture separately introduced. The addition or presence of moisture in the $NO_X$-containing flue gas steam is believed to enhance the reaction of the $NO_X$ in the flue gas with the introduced sorbent, facilitating removal of the $NO_X$ from the flue gas.

When the alkali reagent is employed in dry form, e.g., as a dry sorbent for injection as a particulate solid into the flue gas stream, the reagent is preferably a $NaHCO_3$-containing compound, selected from one or more of the containing $NaHCO_3$-containing materials named above and is employed in finely-divided form.

The particulate alkali sorbent should have a relatively small particle size in order to maximize the surface-to-volume ratio, i.e., thereby enhancing the effectiveness of the gas-solid interaction between the $NO_2$ and alkali sorbent. The mean particle size of the soda sorbent should be less than about 100 μm, preferably less than about 70 μm, and more preferably less than about 40 μm.

Conventional grinding or milling equipment can be employed to achieve these sorbent particle size objectives, if commercially-available particulate alkali sorbents are not already available meeting these particle size requirements. The particle size ranges noted above for dry-injected alkali sorbents are also applicable to particulate alkali reagents that are introduced into the flue gas stream as an aqueous slurry.

The alkali sorbent is injected as a dry particulate solid into the $NO_2$-containing flue gas stream using conventional solids injection equipment, e.g., a screw conveyor, rotary lock valve with blower or other pneumatic injection device, with the proviso that uniform dispersal of the dry sorbent throughout the flue gas stream is desired, to ensure efficient interaction between the sorbent and the $NO_2$ in the flue gas stream.

Likewise, introduction of an alkali reagent as either an aqueous slurry or as an aqueous solution containing the alkali reagent can be carried out using conventional equipment, such as solids/liquid spray injectors or nozzles or solution spray apparatus, e.g., used in in-duct injection procedures or in spray drying operations, that provides uniform and good dispersal of the slurry or solution droplets throughout the flue gas stream. The aqueous liquid medium associated with the reagent is rapidly evaporated in the hot flue gas stream, resulting in formation of particulate solids that remain entrained in the flue gas stream.

The entrained solids in the flue gas stream, whether injected dry sorbent particles or dried particulates (from a slurry or solution), may be captured downstream using the solids recovery equipment normally used in a flue gas pollution control system. Such solids-collection devices include conventional electrostatic precipitators or baghouse filters, typically used to remove fly ash and other solids from a flue gas stream.

As mentioned above, the alkali reagent may be contacted with the flue gas stream as a solution or slurry of water-soluble or partially water-soluble reagent in an aqueous medium, e.g., by using a conventional wet scrubber or absorber with the water-soluble reagent as the scrubber/absorber liquid medium.

In this embodiment of the invention, the $NO_X$-containing flue gas stream, containing very low concentrations of $NH_3$ but still containing residual $NO_X$, is passed through the wet scrubber or absorber and contacted with the scrubber/absorber liquid containing the water-soluble (or partially water-soluble) reagent. The contact procedure is normally carried out in a countercurrent flow fashion. Preferred reagents for wet scrubbing or absorption are soda ash, lime, hydrated lime and limestone in an aqueous medium.

The resulting flue gas stream exits the scrubber/absorber significantly depleted in its $NO_X$-content. The spent scrubber/absorber liquid is normally processed to recover the contaminants absorbed from the gas stream and then recycled with make-up alkali reagent for reuse.

In general and as with the hydrogen peroxide treatment, special gas temperature adjustments (i.e., heating or cooling steps) are not required for the gas stream as a prerequisite of the alkali reagent treatment step, whether carried out with dry sorbent or with the reagent in a liquid medium. The alkali reagent $NO_X$ treatment of the present invention may be carried out with the flue gas stream temperature at whatever temperature the flue gas stream happens to be downstream of the SCR or SNCR treatment procedure. The flue gas temperature ranges will thus be similar to those stated above for the hydrogen peroxide injection step, which is carried out upstream of the alkali reagent $NO_X$ treatment step.

Consequently, the alkali reagent $NO_X$ treatment may be carried out with flue gas stream temperatures ranging from about 250° F. to about 1100° F. for SCR-treated flue gas streams. Flue gas temperatures of within the range of about 250° F. to about 800° F. are preferred for SCR-treated flue gas streams.

In the case of SNCR-treated gas streams, which are typically subjected to SNCR treatment at high flue gas stream temperatures, the alkali reagent $NO_X$ treatment may be carried out with SNCR-treated flue gas stream temperatures ranging from about 250° F. to about 1500° F., with about 300° F. to about 1100° F. being preferred, and about 250° F. to about 800° F. being most preferred. The preferred lower temperatures are possible by locating the alkali reagent $NO_X$ treatment point downstream of the economizer in the flue gas stream ducting in an electric utility power plant.

Desulfurization

The present invention for enhanced $NO_R$ reduction in $NO_X$- and $SO_N$-containing flue gas streams may also be employed in conjunction with desulfurization operations, for reduction or substantial removal of $SO_X$, e.g., $SO_2$ and/or $SO_3$.

Such optional desulfurization unit operations may be carried out either upstream or downstream of the $NH_3$ and $NO_X$ treatment procedures of the present invention or even downstream of the $H_2O_2$ injection point but upstream of the $NO_X$ alkali reagent treatment of this invention. Preferably, the desulfurization is carried out on the $NH_3$- and $NO_X$-depleted flue gas stream, downstream of the treatment procedures of the present invention. This is particularly so in the case of wet desulfurization operations being employed, since exiting flue gas stream temperatures are significantly reduced upon passage through wet scrubbers or absorbers.

The $SO_X$ in combustion flue gas streams is primarily sulfur dioxide ($SO_2$) and sulfur trioxide ($SO_3$). These $SO_X$ components are normally formed during the combustion of sulfur-containing (sour) fuels, such as coal, coke or oil, and the flue gas streams that result from burning such sulfur-containing fuels, whether low-sulfur or high sulfur, consequently contain $SO_X$ contaminants.

Sulfur dioxide is the predominant $SO_X$ component in flue gas streams, with sulfur trioxide, $SO_3$, being produced in much smaller quantities than $SO_2$. Concentrations of $SO_2$ in flue gas streams from coal fired boilers are typically substantial, e.g., about 0.01 vol % to about 0.5 vol % $SO_2$, with about 0.05 vol % to about 0.3 vol % $SO_2$ being typical.

Typical concentrations of $SO_3$ in flue gas streams from coal fired boilers are about 10 ppm to about 30 ppm (by volume) $SO_3$. As mentioned earlier, pollution control operations to remove $NO_X$ components from the flue gas stream, e.g., via selective catalytic reduction (SCR), often result in an unwanted increased concentration of $SO_3$, formed by the catalytic oxidation of $SO_2$ in the flue gas stream during SCR treatment, to levels that can double those normally present, e.g., to about 20 to about 60 ppm or more $SO_3$. Likewise, the presence of catalytic metals, e.g., vanadium or nickel, in some fuels can also result in the generation of additional sulfur trioxide.

These $SO_X$ contaminants are desirably removed, or their concentrations reduced, in the combustion flue gas stream via desulfurization procedures, prior to the flue gas stream being released into the atmosphere. Such desulfurization operations are readily incorporated into an integrated air pollution control system that utilizes the present invention for enhanced $NO_X$ removal, in the treatment of a $NO_X$- and $SO_X$-containing combustion flue gas stream.

Desulfurization processes for removing $SO_2$ and/or $SO_3$ are well known in the air pollution control field. Gas-liquid contactors or absorbers are widely used to remove $SO_2$ from waste flue gas streams, using an alkaline reagent-containing aqueous medium, e.g., in wet scrubbing systems utilizing lime, limestone or soda ash (sodium bisulfate).

Conventional techniques for specific treatment of flue gas streams to reduce $SO_3$ concentrations employ alkali reagents in wet scrubbing, slurry injection or dry sorbent injection procedures. Some prior art desulfurization procedures are effective for removing both $SO_2$ and $SO_3$.

The present invention may be adapted for use with many conventional desulfurization systems, whether employed to remove $SO_X$ components generally or $SO_2$ or $SO_3$ specifically. When used in conjunction with the present invention, such desulfurization systems are preferably located downstream, for desulfurization of the $NH_3$- and $NO_X$-depleted flue gas stream resulting from treatment according to the present invention. Wet desulfurization systems are preferred for use in conjunction with the present invention, particularly wet scrubbing desulfurization systems that employ lime, limestone or soda ash.

Upstream desulfurization may be desirable in situations where flue gas streams contain high concentrations of $SO_3$. Injection of a dry soda-type sorbent or slurried soda-type sorbent can be used to remove a significant portion of $SO_3$ upstream of the ammonia treatment of a $NO_X$- and $SO_X$-containing flue gas stream. An advantage of such upstream $SO_X$ treatment is that excess ammonia can be used, e.g., in an SCR operation, without increasing the likelihood of excess ammonia reacting with $SO_3$ to form ammonium bisulfate or other sulfur salts that may lead to undesirable deposits in the flue gas ductwork or unit operations equipment.

The following non-limiting Example illustrates a preferred embodiment of the present invention.

EXAMPLE

The Example illustrates the application of a preferred embodiment of the present invention to the $NO_X$ and $SO_X$ treatment of a flue gas stream from a combustion boiler utilizing high sulfur coal. The process is operated continuously, and normal steady state conditions are assumed for purposes of the Example. The FIGURE illustrates a schematic flow diagram of this preferred embodiment; reference numerals and letters in the FIGURE are included in the process description which follows. References to gaseous component concentrations in percentage (%), parts per million (ppm) or parts per billion (ppb) refer to such concentrations on a volume basis.

The coal used in the combustion unit of this Example is high sulfur coal containing 2 wt % sulfur. The combustion furnace is operated with preheated air, and it is assumed that there is 1% conversion of the sulfur in the coal to $SO_3$ in flue gas from the combustion unit. The exit combustion flue gas stream 1 contains about 900 parts per million (ppm) $SO_2$, about 9 ppm $SO_3$ and about 420 ppm $NO_R$, i.e., 400 ppm NO and about 20 ppm $NO_2$.

Referring now to the FIGURE, the combustion flue gas stream 1 is passed through an economizer A, a gas-liquid heat exchange unit that reduces the temperature of the hot combustion flue gas stream 1 from about 900° F. to about 700° F. The cooling medium is water (not shown in the FIGURE) which is heated in the economizer A prior to its being directed to the boiler associated with the combustion furnace.

The cooled flue gas stream 2 from the economizer A has essentially the same composition as flue gas stream 1 and is then treated in a selective catalytic reduction reactor A to reduce its $NO_X$ content. This selective catalytic reduction (SCR) unit operation reacts a stoichiometric excess of ammonia 3 with $NO_X$ contained in the flue gas stream 2 as the flue gas stream passes through the catalyst bed in the SCR reactor B. The ammonia 3 is employed in an amount that provides twice the stoichiometric amount required to react with the $NO_X$ that is contained in the flue gas stream 2.

The catalytic reduction reaction of $NO_X$ in the SCR reactor B reduces the NO content of the flue gas stream, producing $N_2$ and water. The catalytic reaction also increases the $SO_3$ content of the SCR-treated flue gas by conversion of a small amount of $SO_2$ to $SO_3$.

The flue gas stream 4 exiting from the SCR unit operation B contains about 890 ppm $SO_2$ and about 18 ppm $SO_3$ and reduced levels of $NO_X$, about 50 ppm $NO_X$. The flue gas stream 4 also contains residual unreacted ammonia, in an amount of about 10 ppm $NH_3$, since the ammonia was used in excess and was therefore not completely reacted during the selective catalytic reduction reaction with $NO_X$ in the SCR reactor B.

The residual $NH_3$-containing flue gas stream 4 is subjected to a treatment with hydrogen peroxide 5, which is injected into the flue gas stream 4 in unit $H_2O_2$ injection unit operation shown as block C in the FIGURE. The hydrogen peroxide 5, an aqueous solution containing 35 wt % $H_2O_2$, is injected into the flue gas stream 4 via spray nozzles in the flue gas ductwork, and is introduced in an amount that provides two moles $H_2O_2$ per mole of residual $NH_3$ in the flue gas stream 4. The $H_2O_2$-injection treatment shown in block C is sufficient to reduce the ammonia content in the exiting gas stream 6 to about 3 ppm $NH_3$, compared to 10 ppm $NH_3$ in the pre-treatment flue gas stream 4.

The flue gas stream 6 contains about 45 ppm $NO_X$, about 3 ppm $NH_3$, about 890 ppm $SO_2$ and about 18 ppm $SO_3$, and is next subjected to a treatment with an alkali reagent. The alkali reagent 7 is particulate trona that is pneumatically conveyed and injected as a dry powder into the flue gas stream 6. The particulate trona, a natural mineral containing $Na_2CO_3 \cdot NaHCO_3 \cdot 2H_2O$, is employed as a finely-milled powder having a mean particle size of less than about 40 µm.

The trona 7 is introduced into contact with the flue gas in a dry injection operation D in the FIGURE, for further reduction of the $NO_X$ content in the flue gas stream 6. The treated flue gas stream 8, downstream of the trona injection operation D, contains a reduced level of $NO_X$, less than 40 ppm $NO_X$.

The flue gas stream 8 downstream of the trona injection operation D is next passed through an air preheater E, a gas-gas heat exchange unit that reduces the temperature of the flue gas stream 8 from about 700° F. to about 330° F. in the exit gas stream 9. The cooling medium in the air preheater E is air (not shown in the FIGURE) which is heated in the air preheater E prior to its being directed to the combustion furnace to burn the coal.

The flue gas stream 9 exiting from the air preheater E is directed to one or more electrostatic precipitators (ESP), shown as block F labeled as ESP in the FIGURE, to remove entrained solids, i.e., particulates, from the flue gas stream 9. The entrained solids in the flue gas stream 9 include fly ash, from the coal combustion, and spent trona after its reaction with $NO_X$ in the flue gas stream. The solids-free ESP-treated flue gas exits the electrostatic precipitator operation F as flue gas stream 10. The ESP solids, removed as stream 11, are disposed of in a landfill.

The ESP-treated flue gas stream 10, having a reduced, low $NH_3$ concentration, also has its $NO_X$ content significantly reduced, as compared with the combustion flue gas stream 2 upstream of the SCR reactor B: the flue gas stream 10, downstream of the ESP operation F, contains about 3 ppm $NH_3$ and less than 40 ppm $NO_X$.

The $SO_X$-containing flue gas stream 10 is preferably subjected to a desulfurization procedure (not shown in the FIGURE) to reduce its $SO_2$ and $SO_3$ content before the flue gas stream is vented to the atmosphere. Wet desulfurization scrubbing operations using an alkali such as lime, limestone or soda ash, are well known procedures for desulfurizing $SO_X$-containing flue gas streams.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method for removing NOx from a flue gas stream comprising subjecting an electric utility power plant combustion flue gas stream containing NOx to a selective catalytic reduction operation or selective non-catalytic reduction operation by injecting ammonia or an ammonia-forming compound into the flue gas stream as an agent for reducing the NOx, wherein an excess of ammonia is introduced to yield a flue gas stream containing unreacted residual ammonia and a reduced concentration of NOx; and thereafter injecting hydrogen peroxide into the flue gas stream containing unreacted residual ammonia, in an amount sufficient to react with the residual ammonia present in the flue gas stream, the flue gas having a temperature of up to about 700° F. during the hydrogen peroxide injection operation, and wherein the reduction operation and the hydrogen peroxide injection operation are downstream from an economizer, to yield a flue gas stream having a reduced concentration of residual ammonia.

2. The method of claim 1 wherein the ammonia is introduced into flue gas stream in an amount sufficient to provide at least about 50% stoichiometric molar excess, based on the amount of $NO_X$ present in the flue gas stream.

3. The method of claim 1 wherein the hydrogen peroxide is employed as an aqueous hydrogen peroxide solution in combination with an activator.

4. The method of claim 1 wherein the hydrogen peroxide is injected into the ammonia-containing flue gas stream in an amount sufficient to provide at least about ¼ mole $H_2O_2$ per mole $NH_3$ up to about 15 moles of $H_2O_2$ per mole $NH_3$ present in the flue gas stream.

5. The method of claim 1 wherein sufficient hydrogen peroxide is contacted with the ammonia-containing flue gas stream to reduce the ammonia concentration in the $H_2O_2$-treated flue gas stream to less than about 10 ppm $NH_3$.

* * * * *

UNITED STATES PATENT AND TRADEMARK OFFICE
CERTIFICATE OF CORRECTION

PATENT NO.        : 8,877,149 B2                                               Page 1 of 1
APPLICATION NO.   : 13/369881
DATED             : November 4, 2014
INVENTOR(S)       : Pfeffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 247 days.

Signed and Sealed this
Sixth Day of June, 2017

Michelle K. Lee
*Director of the United States Patent and Trademark Office*